United States Patent
Zhu et al.

(10) Patent No.: US 10,797,349 B2
(45) Date of Patent: Oct. 6, 2020

(54) ELECTROLYTE FORMULATIONS FOR ELECTROCHEMICAL CELLS CONTAINING A SILICON ELECTRODE

(71) Applicant: Wildcat Discovery Technologies, Inc., San Diego, CA (US)

(72) Inventors: Ye Zhu, San Diego, CA (US); Gang Cheng, San Diego, CA (US); Deidre Strand, San Diego, CA (US); Jen-Hsien Yang, San Diego, CA (US)

(73) Assignee: WILDCAT DISCOVERY TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 16/186,619

(22) Filed: Nov. 12, 2018

(65) Prior Publication Data

US 2019/0081357 A1    Mar. 14, 2019

Related U.S. Application Data

(63) Continuation of application No. 15/251,755, filed on Aug. 30, 2016, now Pat. No. 10,128,537.

(51) Int. Cl.
*H01M 4/505* (2010.01)
*H01M 10/0567* (2010.01)
*H01M 4/38* (2006.01)
*H01M 4/525* (2010.01)
*H01M 10/0525* (2010.01)
*H01M 10/0569* (2010.01)

(52) U.S. Cl.
CPC ....... *H01M 10/0567* (2013.01); *H01M 4/386* (2013.01); *H01M 4/505* (2013.01); *H01M 4/525* (2013.01); *H01M 10/0525* (2013.01); *H01M 10/0569* (2013.01)

(58) Field of Classification Search
None
See application file for complete search history.

(56) References Cited

U.S. PATENT DOCUMENTS

| | | |
|---|---|---|
| 3,433,679 A | 3/1969 | Johnson et al. |
| 4,588,662 A | 5/1986 | McManis et al. |

(Continued)

FOREIGN PATENT DOCUMENTS

| | | |
|---|---|---|
| KR | 20140098447 A | 8/2014 |
| WO | 2015053558 A1 | 4/2015 |
| WO | 2015160773 A1 | 10/2015 |

OTHER PUBLICATIONS

Azimi, Nasim, et al., "Fluorinated Electrolyte for Li—S Battery: Suppressing the Self-Discharge with an Electrolyte Containing Fluoroether Solvent", Journal of The Electrochemical Society, 162(1), A64-A68 (2015).

(Continued)

*Primary Examiner* — Tracy M Dove
(74) *Attorney, Agent, or Firm* — The Small Patent Law Group LLC; Philip S. Hof

(57) ABSTRACT

Additives to electrolytes that enable the formation of comparatively more robust SEI films on silicon anodes. The SEI films in these embodiments are seen to be more robust in part because the batteries containing these materials have higher coulombic efficiency and longer cycle life than comparable batteries without such additives. The additives preferably contain a nitrate group.

14 Claims, 1 Drawing Sheet

(56) References Cited

U.S. PATENT DOCUMENTS

| | | | |
|---|---|---|---|
| 4,740,437 A | 4/1988 | Fujii et al. | |
| 5,691,081 A | 11/1997 | Krause et al. | |
| 6,060,184 A | 5/2000 | Gan et al. | |
| 6,136,477 A | 10/2000 | Gan et al. | |
| 6,221,534 B1 | 4/2001 | Takeuchi et al. | |
| 6,379,846 B1 | 4/2002 | Terahara et al. | |
| 6,403,256 B1 | 6/2002 | Gan et al. | |
| 6,544,691 B1 | 4/2003 | Guidotti | |
| 7,172,834 B1 | 2/2007 | Jow et al. | |
| 7,358,012 B2 | 4/2008 | Mikhaylik | |
| 7,732,093 B2 | 6/2010 | Xiao et al. | |
| 8,795,868 B1* | 8/2014 | Miles | H01M 4/405 |
| | | | 429/110 |
| 8,795,903 B2 | 8/2014 | Smart et al. | |
| 2002/0068222 A1* | 6/2002 | Ishii | H01M 4/628 |
| | | | 429/347 |
| 2002/0136950 A1 | 9/2002 | Gan et al. | |
| 2004/0175609 A1 | 9/2004 | Yageta et al. | |
| 2005/0106470 A1 | 5/2005 | Yoon et al. | |
| 2006/0208701 A1 | 9/2006 | Mikhaylik | |
| 2006/0222944 A1 | 10/2006 | Yamamoto et al. | |
| 2007/0218364 A1 | 9/2007 | Whitacre et al. | |
| 2008/0118833 A1 | 5/2008 | Ueda et al. | |
| 2011/0217599 A1 | 9/2011 | Yamamoto et al. | |
| 2012/0100417 A1 | 4/2012 | Ramprasad | |
| 2012/0288771 A1 | 11/2012 | Lim et al. | |
| 2013/0209915 A1 | 8/2013 | Hirashita et al. | |
| 2013/0260229 A1 | 10/2013 | Uzun et al. | |
| 2013/0337347 A1 | 12/2013 | Pol et al. | |
| 2014/0011081 A1 | 1/2014 | Ahn et al. | |
| 2014/0023936 A1 | 1/2014 | Belharouak et al. | |
| 2014/0170459 A1 | 6/2014 | Wang et al. | |
| 2014/0287326 A1 | 9/2014 | Mikhaylik | |
| 2015/0064568 A1 | 3/2015 | Yushin et al. | |
| 2015/0099188 A1* | 4/2015 | Holme | H01M 10/0525 |
| | | | 429/231.95 |
| 2016/0087311 A1 | 3/2016 | Doelle et al. | |
| 2016/0240889 A1 | 8/2016 | Cheng et al. | |

OTHER PUBLICATIONS

International Search Report & Written Opinion dated Dec. 5, 2017 in International application No. PCT/US2017/049102.

Kim, Hyung Sun, et al. "The cycling performances of lithium-sulfur batteries in TEGDME/DOL containing LiNO3 additive", Iconics 19:1795-1802 (2013).

Yan, Gouchun, et al., "Tris(trimethylsilyl)phosphate: A film-forming additive for high voltage cathode material in lithium-ion batteries", Journal of Power Sources, 248 (2014) 1306-1311.

* cited by examiner

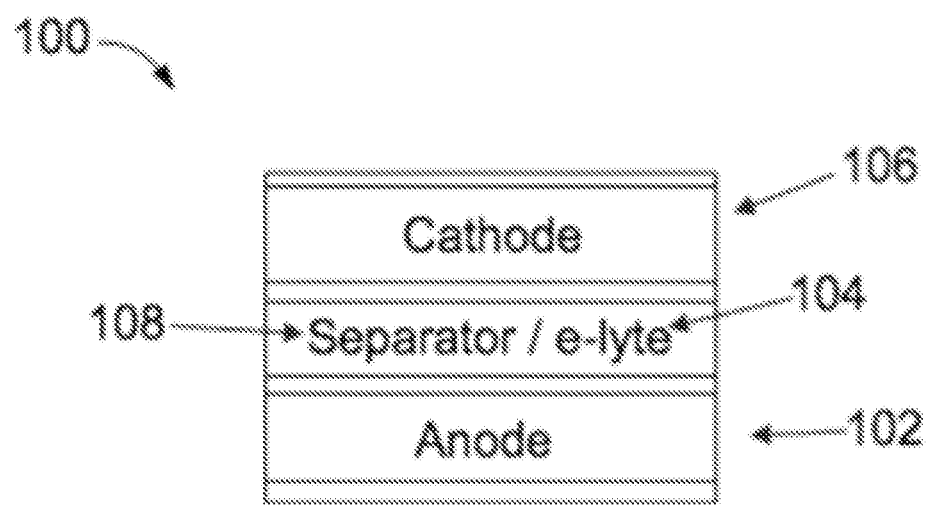

ELECTROLYTE FORMULATIONS FOR ELECTROCHEMICAL CELLS CONTAINING A SILICON ELECTRODE

STATEMENT REGARDING FEDERALLY SPONSORED RESEARCH OR DEVELOPMENT

This invention was made with government support under DOE EE0006453 awarded by the Department of Energy. The government has certain rights in the invention.

CROSS-REFERENCE TO RELATED APPLICATIONS

This application is related to and claims priority benefits from U.S. Non-Provisional patent application Ser. No. 15/251,755 filed Aug. 30, 2016 entitled "Electrolyte Formulations for Electrochemical Cells Containing a Silicon Electrode". The '755 application is hereby incorporated by reference in its entirety.

BACKGROUND OF THE INVENTION

The present invention is in the field of battery technology and, more particularly, electrolyte formulations that address challenges encountered during the use of silicon anodes in lithium ion batteries.

Lithium ion batteries enjoy relatively widespread use, but research continues into improving the energy density, capacity, and cycle life of these batteries. For example, silicon has been used as an anode material to improve the energy density of lithium ion cells. Silicon anodes can provide high energy density to lithium ion batteries due to the high theoretical capacity of silicon, which is 4200 mAh/g. However, the silicon particles that make up the anode can undergo larges changes in their volume during battery cycling. The volumetric changes on lithiation and delithiation cycles can be as large as about 300%.

These large volumetric changes in the silicon anode material can have negative effects on battery cycle life. A number of mechanisms may contribute to poor cycle life. For example, silicon particles can fracture due to the large stresses in the material brought on by the large changes in volume during cycling. These fractures can result in electrically isolated particle fragments that can no longer contribute to the capacity during cycling. Even when silicon particles do not completely fracture, the large stresses in the anode material can result in cracks in the particle and delamination of the particle surface. These cracks and delaminations can result in portions of the active material being electrically isolated and unable to contribute to the capacity during cycling.

As another example of a failure mechanism, the solid-electrolyte interphase (SEI) that forms on the surface of silicon anode particles tends to not be mechanically robust. The result is cracking and delamination of this thin SEI layer on the particles as the large volume changes occur. Therefore, more SEI must be formed on each cycle to replace the cracked or delaminated SEI. But, this is not ideal because forming SEI irreversibly consumes battery capacity and creates gas products. Generally, a stable SEI should be formed on the initial cycles and should not need to be reformed.

Thus, there exists a need for an electrolyte formulation for silicon anodes in a lithium ion battery that improves cycle life by forming a more mechanically robust SEI. These and other challenges can be addressed by certain embodiments of the invention described herein.

BRIEF SUMMARY OF THE INVENTION

Embodiments of the present invention are additives to electrolytes that enable the formation of comparatively more robust SEI films on silicon anodes. The SEI films in these embodiments are seen to be more robust in part because the batteries containing these materials have higher coulombic efficiency and longer cycle life than comparable batteries without such additives.

Embodiments of the present invention include the methods of making such electrolytes using the additives disclosed herein, the methods of assembling batteries including such electrolytes using the additives disclosed herein, and using batteries including such electrolytes using the additives disclosed herein.

Embodiments of the present invention include an electrochemical cell having a silicon based anode and a liquid electrolyte solution comprising an additive. The additive is represented by one or more of the chemical structural formulas:

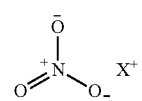

(b)

where X is a metal group or an organic group, or

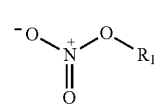

(d)

where $R_1$ is selected from the group consisting of hydrogen, substituted and unsubstituted $C_1$-$C_{20}$ alkyl groups, substituted and unsubstituted $C_1$-$C_{20}$ alkenyl groups, substituted and unsubstituted $C_1$-$C_{20}$ alkynyl groups, substituted and unsubstituted $C_5$-$C_{20}$ aryl groups, hydride groups, halo groups, hydroxy groups, thio groups, alkyl groups, alkenyl groups, alkynyl groups, aryl groups, iminyl groups, alkoxy groups, alkenoxy groups, alkynoxy groups, aryloxy groups, carboxy groups, alkylcarbonyloxy groups, alkenylcarbonyloxy groups, alkynylcarbonyloxy groups, arylcarbonyloxy groups, alkylthio groups, alkenylthio groups, alkynylthio groups, arylthio groups, cyano groups, N-substituted amino groups, alkylcarbonylamino groups, N-substituted alkylcarbonylamino groups, alkenylcarbonylamino groups, N-substituted alkenyl carbonylamino groups, alkynylcarbonyl amino groups, N-substituted alkynylcarbonylamino groups, arylcarbonylamino groups, N-substituted arylcarbonylamino groups, boron-containing groups, aluminum-containing groups, silicon-containing groups, phosphorus-containing groups, and sulfur-containing groups.

BRIEF DESCRIPTION OF SEVERAL VIEWS OF THE DRAWINGS

FIG. 1 illustrates a lithium ion battery implemented according to an embodiment of the invention.

DETAILED DESCRIPTION OF THE INVENTION

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "NMC" refers generally to cathode materials containing $LiNi_xMn_yCo_zO_w$ and includes, but is not limited to, cathode materials containing $LiNi_{0.33}Mn_{0.33}Co_{0.33}O_2$. Typically, x+y+z=1.

Ranges presented herein are inclusive of their endpoints. Thus, for example, the range 1 to 3 includes the values 1 and 3 as well as the intermediate values.

In some embodiments disclosed herein, electrolyte solutions formulated to contain specific additive types can improve energy density, capacity, and cycle life of these batteries.

FIG. 1 illustrates a lithium ion battery 100 implemented in accordance with an embodiment of the invention. The battery 100 includes an anode 102, a cathode 106, and a separator 108 that is disposed between the anode 102 and the cathode 106. In the illustrated embodiment, the battery 100 also includes a high voltage electrolyte 104, which is disposed within and between the anode 102 and the cathode 106 and remains stable during high voltage battery cycling.

The operation of the battery 100 is based upon reversible intercalation and de-intercalation of lithium ions into and from host materials of the anode 102 and the cathode 106. Other implementations of the battery 100 are contemplated, such as those based on conversion chemistry. Referring to FIG. 1, the voltage of the battery 100 is based on redox potentials of the anode 102 and the cathode 106, where lithium ions are accommodated or released at a lower potential in the former and a higher potential in the latter. To allow both a higher energy density and a higher voltage platform to deliver that energy, the cathode 106 includes an active cathode material for high voltage operations at or above 4.3V.

Silicon-containing anodes can provide a higher energy density than carbon-based anodes. While the theoretical capacity of a silicon anode is on the order of 4200 mAh/g, it is necessary to balance the high capacity of a silicon anode with the undesirable properties that a silicon anode can have. For example, a silicon anode can have relatively high changes in volume during a charge/discharge cycle. The volumetric changes in a silicon anode can be from 70% to 300% over the range of desired anode capacities. That is, for an anode where only a small portion of the silicon capacity is utilized, the silicon may experience a volumetric change on the order of about 70%. In contrast, for an anode where a comparatively high portion of the silicon capacity is utilized, the silicon may experience a volumetric change on the order of about 300%. In certain embodiments disclosed herein, silicon anodes with capacities in the range of about 600 mAh/g to about 1200 mAh/g are matched with cathode materials having a similar capacity to yield a battery that demonstrates stable cycle life in the presence of an electrolyte containing additives discloses herein. The electrolyte additives disclosed herein provide an unexpected improvement in the capacity fade during cycling compared to the baseline formulations without such additives in batteries containing a silicon-based anode.

Known batteries containing silicon anodes experience limited cycle life and poor coulombic efficiency. The deficiencies of known batteries containing silicon-based anode can be due to a loss of connectivity in the anode of the active silicon material. The loss of connectivity can be due to structural defects in the anode related to the large change in volume experienced by the anode. The large volumetric changes can result in cracking and/or delamination of the electrode. Also, the large volumetric changes may be related to an unstable or ineffective SEI on the active silicon electrode. Further, the SEI formed from an ethylene carbonate based electrolyte on a silicon anode may also be unstable or ineffective regardless of the volumetric changes experiences by a silicon-based anode.

Certain additives disclosed herein improve the mechanical stability of the SEI formed in the presence of common electrolyte solvents such as ethylene carbonate. The additives disclosed herein provide surprising improvements to the performance of batteries containing silicon-based anodes. Unexpectedly, the additives do not demonstrate similar performance improvements in batteries having graphite anodes.

The additives disclosed herein yield an electrolyte solution that provides an electrochemically and mechanically robust SEI. The additives disclosed herein yield an electrolyte solution that enables the SEI to withstand the relatively large volumetric expansions and contractions known to occur in silicon-based anodes. These additives enable both the anode and cathode to be chemically, electrochemically, and mechanically stable through multiple battery cycles.

Certain additives disclosed in electrolyte formulations described herein are capable of enabling the formation of stable SEI with organic solvents such as ethylene carbonate. Based on prior uses of silicon anodes, it appears that electrolytes based on ethylene carbonate are inadequate for forming a stable SEI. Surprisingly, the additives disclosed herein can yield a stable SEI on a silicon-based anode when used in electrolyte formulations based on ethylene carbonate. Further, other solvent types may be used in conjunction with, or instead of, ethylene carbonate. For example, solvents including lactone, nitrile, sulfone, and carbonates groups may be useful.

Prior art electrolyte formulations for silicon anodes, and for the more common carbon anodes, contain ethylene carbonate (EC). EC is understood to play an important role in the formation of a stable SEI on carbon anodes. EC also participates in SEI formation on silicon, but, as discussed above, the SEI formed on silicon anodes using conventional electrolytes (including EC) is not mechanically robust. The lack of mechanical robustness is evidenced by poor electrochemical performance, such as poor coulombic efficiency and poor cycle life. Physically, films that lack mechanical robustness may appear to be inhomogeneous and/or may appear to have physical defects. Mechanically robust SEI forms a stable film at the electrode/electrolyte interface.

Using electrolyte additives disclosed herein, improvement was demonstrated in full cells containing NMC cathodes and silicon alloy based anodes. The electrolyte formulations preferably contain EC. Certain additives can improve coulombic efficiency and cycle life by forming a more mechanically robust SEI layer on the silicon anode. This may be due to a more polymeric nature of the resulting SEI or a modified ratio of organic components as compared to inorganic components in the SEI.

Without being bound to any particular hypothesis or mechanism of action, some of the additives disclosed herein may react with the EC to increase the molecular weight of the SEI that forms on the anode. Certain additives may act in a way analogous to chain extenders in the context of polymer formulation and processing, thereby increasing the molecular weight and film forming capability of the SEI that is typically generated from the EC in a conventional electrolyte solution.

The amount of additive can be expressed as a weight percent (wt %) of the total weight of the electrolyte formulation. In certain embodiments of the invention, the additive is present at an amount that is significantly lower than the amount of electrolyte salt present in the electrolyte formulation of the electrochemical cell. In certain embodiments of the invention, the concentration of additive in the electronic formulation is less than or equal to about 5 weight percent, more preferably less than or equal to about 4 weight percent, more preferably less than or equal to about 3 weight percent, and still more preferably less than or equal to about 2 weight percent.

In certain embodiments of the invention, the concentration of additive in the electronic formulation is equal to about 6.0 wt %, 5.9 wt %, 5.8 wt %, 5.7 wt %, 5.6 wt %, 5.5 wt %, 5.4 wt %, 5.3 wt %, 5.2 wt %, 5.1 wt %, 5.0 wt %, 4.9 wt %, 4.8 wt %, 4.7 wt %, 4.6 wt %, 4.5 wt %, 4.4 wt %, 4.3 wt %, 4.2 wt %, 4.1 wt %, 4.0 wt %, 3.9 wt %, 3.8 wt %, 3.7 wt %, 3.6 wt %, 3.5 wt %, 3.4 wt %, 3.3 wt %, 3.2 wt %, 3.1 wt %, 3.0 wt %, 2.9 wt %, 2.8 wt %, 2.7 wt %, 2.6 wt %, 2.5 wt %, 2.4 wt %, 2.3 wt %, 2.2 wt %, 2.1 wt %, 2.0 wt %, 1.9 wt %, 1.8 wt %, 1.7 wt %, 1.6 wt %, 1.5 wt %, 1.4 wt %, 1.3 wt %, 1.2 wt %, 1.1 wt %, 1.0 wt %, 0.9 wt %, 0.8 wt %, 0.7 wt %, 0.6 wt %, 0.5 wt %, 0.4 wt %, 0.3 wt %, 0.2 wt %, or 0.1 wt %.

In certain embodiments, useful additives share common chemical features, such as the presence of a nitrate group, which is represented in formula (a):

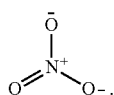

(a)

Preferably, the nitrate group, which is charged, is in a complex with another charged moiety. For example, the nitrate group can be complexed as represented in formula (b):

(b)

where X is a metal group or an organic group. Preferably, X is a metal or metal group selected from or containing certain alkali metals, such as lithium, sodium, or cesium. In another preferred embodiment, X is a metal or metal group selected from or containing certain alkaline earth metals, such as magnesium. In still another preferred embodiment, X is a metal or metal group selected from or containing certain post transition metals, such as aluminum. Thus, particularly preferred additives include, but are not limited to, cesium nitrate ($CsNO_3$), lithium nitrate ($LiNO_3$), sodium nitrate ($NaNO_3$), aluminum nitrate ($Al(NO_3)_3$), and magnesium nitrate ($Mg(NO_3)_2$).

In still other embodiments, X is an organic ion or a charged organic moiety. A preferred example of an additive where X is an organic ion is tetramethyl ammonium nitrate, which is represented by formula (c):

(c)

Other ammonium nitrate additives where one or methyls have been substituted with lower alkyls (including branched and substituted alkyls) may also be suitable additives. Thus, while tetramethyl ammonium nitrate is an exemplary additive containing an organic ion, other organic nitrates are included in this disclosure. For example, nitrates may be complexed with organic ions including groups selected from substituted and unsubstituted $C_1$-$C_{20}$ alkyl groups, substituted and unsubstituted $C_1$-$C_{20}$ alkenyl groups, substituted and unsubstituted $C_1$-$C_{20}$ alkynyl groups, substituted and unsubstituted $C_5$-$C_{20}$ aryl groups, hydride groups, halo groups, hydroxy groups, thio groups, alkyl groups, alkenyl groups, alkynyl groups, aryl groups, iminyl groups, alkoxy groups, alkenoxy groups, alkynoxy groups, aryloxy groups, carboxy groups, alkylcarbonyloxy groups, alkenylcarbonyloxy groups, alkynylcarbonyloxy groups, arylcarbonyloxy groups, alkylthio groups, alkenylthio groups, alkynylthio groups, arylthio groups, cyano groups, N-substituted amino groups, alkylcarbonylamino groups, N-substituted alkylcarbonylamino groups, alkenylcarbonylamino groups, N-substituted alkenyl carbonylamino groups, alkynylcarbonyl amino groups, N-substituted alkynylcarbonylamino groups, arylcarbonylamino groups, N-substituted arylcarbonylamino groups, boron-containing groups, aluminum-containing groups, silicon-containing groups, phosphorus-containing groups, and sulfur-containing groups.

Still other embodiments include organic nitrates having a structure represented by formula (d):

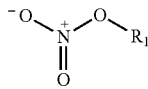
(d)

where $R_1$ is selected from the group consisting of hydrogen, substituted and unsubstituted $C_1$-$C_{20}$ alkyl groups, substituted and unsubstituted $C_1$-$C_{20}$ alkenyl groups, substituted and unsubstituted $C_1$-$C_{20}$ alkynyl groups, substituted and unsubstituted $C_5$-$C_{20}$ aryl groups, hydride groups, halo groups, hydroxy groups, thio groups, alkyl groups, alkenyl groups, alkynyl groups, aryl groups, iminyl groups, alkoxy groups, alkenoxy groups, alkynoxy groups, aryloxy groups, carboxy groups, alkylcarbonyloxy groups, alkenylcarbonyloxy groups, alkynylcarbonyloxy groups, arylcarbonyloxy groups, alkylthio groups, alkenylthio groups, alkynylthio groups, arylthio groups, cyano groups, N-substituted amino groups, alkylcarbonylamino groups, N-substituted alkylcarbonylamino groups, alkenylcarbonylamino groups, N-substituted alkenyl carbonylamino groups, alkynylcarbonyl amino groups, N-substituted alkynylcarbonylamino groups, arylcarbonylamino groups, N-substituted arylcarbonylamino groups, boron-containing groups, aluminum-containing groups, silicon-containing groups, phosphorus-containing groups, and sulfur-containing groups.

Preferably, the organic nitrate is isobutyl nitrate, which is represented by formula (e):

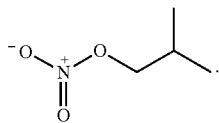
(e)

Of course, other lower alkyl variations on the isobutyl nitrate structure may be suitable additives.

In preferred embodiments, the additive is substantially soluble in conventional electrolyte solvents.

Methods

Battery Cell Assembly.

Battery cells were assembled in a high purity argon filled glove box (M-Braun, $O_2$ and humidity content <0.1 ppm). A $LiNi_{0.33}Mn_{0.33}Co_{0.33}O_2$ (NMC) cathode electrode and a silicon alloy anode electrode was used. For control cells, an NMC cathode electrode and a graphite anode electrode were used. Each battery cell includes a cathode film, a polypropylene separator, and composite anode film. Electrolyte components were formulated and added to the battery cell.

Electrolyte Formulations.

Electrolyte formulations used as controls were made from one or more organic solvents and a lithium salt. Organic solvents ethylene carbonate (EC) and ethyl methyl carbonate (EMC) were blended at a 1:2 ratio, by volume, of EC:EMC. The lithium salt was $LiPF_6$ at a concentration of 1M. The electrolyte formulations containing additives were made from 1:2 ratio, by volume, of EC:EMC with 1M $LiPF_6$ at a variety of additive weight percentages.

SEI Formation.

Solid-electrolyte interphase (SEI) is formed during a formation cycle. For the cells tested herein, the formation cycle was 12 hours open circuit voltage (OCV) hold, followed by a C/10 charge to 4.2 V with a constant voltage (CV) hold to C/20, and then a C/10 discharge to 2.8 V.

Cycle Life Testing.

For cycle life testing, cycling was continued at C/3 charge to 4.2 V with a CV hold to C/20 followed by a C/3 discharge to 2.8 V. In the tables presented herein, the performance metrics are calculated from the average of two tested cells.

Results

Table 1 presents the electrochemical performance of electrolyte formulations containing various additives according to certain combinations of the above structural representations as compared to a control electrolyte formulation. The additives were tested at formulations including 2 weight percent of the additive and 0.5 weight percent of the additive, in each case with EC/EMC organic solvents. The cathode included NMC as the active material. The capacity retention at the two hundredth discharge cycle is presented in the far right column as a percentage of the capacity at the initial test cycle.

TABLE 1

Performance of electrolyte additives in EC based electrolyte with silicon anode

| Additive | Conc. (%) | Initial Capacity at 0.33 C (mAh/g) | Cycle 200 Capacity (mAh/g) | Cycle 200 Capacity retention (%) |
|---|---|---|---|---|
| None | 0.0 | 139 | 70 | 53.0 |
| $CsNO_3$ | 2.0 | 136 | 122 | 89.6 |
| $LiNO_3$ | 2.0 | 137 | 113 | 82.4 |
| $LiNO_3$ | 0.5 | 138 | 116 | 84.5 |
| $NaNO_3$ | 2.0 | 135 | 112 | 82.8 |
| $NaNO_3$ | 0.5 | 138 | 120 | 87.1 |
| $Al(NO_3)_3$ | 0.5 | 127 | 104 | 81.6 |
| $Mg(NO_3)_2$ | 0.5 | 123 | 100 | 81.0 |
| isobutyl nitrate | 2 | 122 | 90 | 73.5 |
| tetramethyl ammonium nitrate | 2 | 137 | 111 | 80.9 |

Table 1 demonstrates that certain nitrate additives in EC-containing formulations result in much improved cycle life at cycle 200 as compared to an EC-based carbonate electrolyte (EC/EMC) without the additives. The electrolyte formulations containing the additives resulted in up to a 36% improvement in capacity retention at cycle 200 compared to EC/EMC control without the additives. This is a substantial improvement in the cycle life (that is, capacity retention) as compared to the prior art silicon anode systems.

As described herein, certain nitrate-containing additives demonstrated improvement when used in batteries having a silicon-based anode, but did not show comparable improvement in batteries have a graphite anode. Table 2 presents the electrochemical performance of electrolyte formulations containing the certain of the same additives as Table 1. The cathode included NMC as the active material. The capacity retention at the two hundredth discharge cycle is presented in the far right column as a percentage of the capacity at the initial test cycle.

TABLE 2

Performance of electrolyte additives in
EC based electrolyte with graphite anode

| Additive | Conc. (%) | Initial Capacity at 0.33 C (mAh/g) | Cycle 200 Capacity (mAh/g) | Cycle 200 Capacity retention (%) |
|---|---|---|---|---|
| None | 0.0 | 136.8 | 122.3 | 90.0 |
| LiNO$_3$ | 2.0 | 144.7 | 106.8 | 73.8 |
| NaNO$_3$ | 2.0 | 142.0 | 45.0 | 31.7 |

Table 2 provides important insights into the additives. First, the control (that is, the electrolyte formulation without any additives) performs significantly better on graphite anodes (Table 2) than silicon anodes (Table 1). The additives not only perform worse than the control on graphite anodes, but also perform worse on graphite anodes (Table 2) than on silicon anodes (Table 1). Thus, there appears to be unique synergies between the additives of the invention and silicon-based anodes.

The silicon-based anode is actually a composite with greater than 50% graphite. Unexpectedly, the results in Table 1 demonstrate that the additives improve the performance on the silicon-based composite anode even in the presence of graphite, which shows no improvement.

Finally, the data demonstrate that the additives showed no negative effect on initial discharge capacity compared to the control electrolytes.

Without being bound to any particular hypothesis or mechanism of action, the nitrate-based additives disclosed herein may serve as strong oxidants, oxidizing and functionalizing silicon particle surfaces with an SiO$_x$-enriched surface layer. The electrochemical reduction of nitrates typically consumes H$^+$, which may also help to prevent the decomposition of the SEI layer since H$^+$ is well known to be detrimental to the stability of SEI layers. Further, the additives may aid in balancing the inorganic and organic content of the SEI, which can promote a stable and robust SEI.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. An electrochemical cell comprising:
a silicongraphite composite anode that comprises greater than 50 weight percent graphite;
a cathode comprising a lithium ion intercalating material, wherein discharge and recharge of the electrochemical cell is accomplished by intercalation and de-intercalation of lithium ions into and from the cathode; and
a liquid electrolyte solution comprising an additive, wherein the additive is represented by the chemical structural formula:

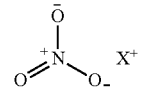

(i)

where X comprises a metal group selected from the group consisting of alkaline earth metals and post transition metals.

2. The electrochemical cell of claim 1, wherein the lithium ion intercalating material is represented by the chemical structural formula:

$$LiNi_xMn_yCo_zO_2 \quad (ii)$$

where x+y+z=1.

3. The electrochemical cell of claim 1, wherein the lithium ion intercalating material is represented by the chemical structural formula LiNi$_{0.33}$Mn$_{0.33}$Co$_{0.33}$O$_2$.

4. The electrochemical cell of claim 1, wherein X comprises an alkaline earth metal.

5. The electrochemical cell of claim 4, wherein X comprises magnesium.

6. The electrochemical cell of claim 5, wherein the additive comprises magnesium nitrate.

7. The electrochemical cell of claim 1, wherein X comprises a post transition metal.

8. The electrochemical cell of claim 7, wherein X comprises aluminum.

9. The electrochemical cell of claim 8, wherein the additive comprises aluminum nitrate.

10. The electrochemical cell of claim 1, wherein a concentration of the additive is no greater than 6 weight percent of a total weight of the liquid electrolyte solution.

11. The electrochemical cell of claim 1, wherein the liquid electrolyte solution further comprises an organic solvent that comprises ethylene carbonate.

12. An electrochemical cell comprising:
a silicongraphite composite anode that comprises greater than 50 weight percent graphite of a total weight of the silicon-graphite composite anode;
a cathode comprising a lithium ion intercalating material, wherein discharge and recharge of the electrochemical cell is accomplished by intercalation and de-intercalation of lithium ions into and from the cathode; and
a liquid electrolyte solution comprising a lithium salt, an organic solvent, and an additive, wherein the additive is one of magnesium nitrate or aluminum nitrate.

13. The electrochemical cell of claim 12, wherein the organic solvent comprises ethylene carbonate.

14. The electrochemical cell of claim 12, wherein a concentration of the additive is no greater than 6 weight percent of a total weight of the liquid electrolyte solution.

* * * * *